June 19, 1923.
F. G. HENNING
SAFETY GAS HOSE
Filed Dec. 7, 1920
1,459,100
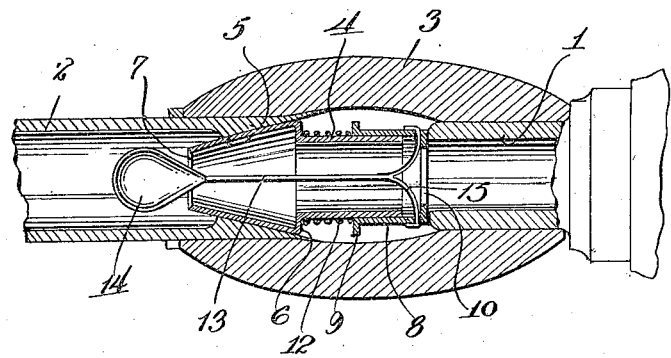
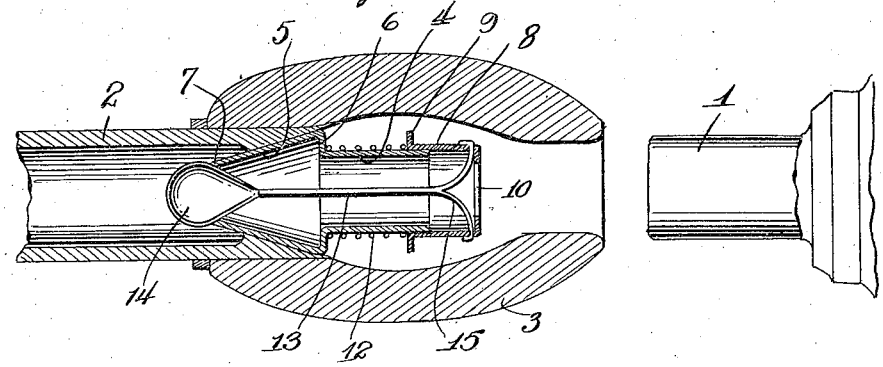

Patented June 19, 1923.

1,459,100

UNITED STATES PATENT OFFICE.

FREDRICK G. HENNING, OF BROOKLYN, NEW YORK.

SAFETY GAS HOSE.

Application filed December 7, 1920. Serial No. 428,959.

*To all whom it may concern:*

Be it known that I, FREDRICK G. HENNING, a citizen of the United States, residing at Brooklyn, in the county of Kings and State of New York, have invented certain new and useful Improvements in a Safety Gas Hose, of which the following is a specification.

This invention relates to safety valves and more particularly to an automatic safety device to be placed in a gas connection between an intake pipe and a supply pipe.

The primary object of the invention is to provide an automatically operated valve which will be held in open position while the gas pipe is connected to the fixture or heating unit and which will immediately operate to move to closed position whenever the gas pipe is disconnected.

Another object of the invention is to provide a safety device of this character which may be conveniently placed in the end of a flexible hose or pipe, such as is commonly used for connecting a source of gas supply to a stove or heater whereby the valve will be in a position to be conveniently operated when the gas pipe is attached or detached Other objects of the invention will appear upon consideration of the following detail description and accompanying drawings:—

Figure 1 is a longitudinal section through the device showing it mounted in the end of a gas pipe and in open position, Figure 2 is a similar view showing the valve in closed position, the gas pipe being disconnected.

Referring to the drawing by numerals, the nipple or intake pipe 1 is connected to the heater or stove and is adapted to be connected to the flexible supply pipe or hose 2 through the medium of a sleeve or coupling member 3. The latter is usually attached to the flexible hose 2 in any convenient manner and is constructed of rubber so that it may be thrust on the nipple 1 to form a tight connection whereby the gas may be readily supplied to the heater or stove.

Within the sleeve 3 is mounted the safety valve which consists of a cylindrical tube 4 having a frusto-conical end portion 5, thereby forming a shoulder 6. The frusto-conical portion 5 is fitted within the connecting coupling or sleeve 3 and has a restricted open end 7. Slidably mounted upon the tube 4 is a cylindrical cap 8 which has an annular flange 9 and an open end 10.

A coil spring 12 is interposed between the shoulder 6 and the annular flange 9 whereby the coil spring tends to move the cap 8 outwardly as shown to advantage in Fig. 2. The valve member consists of a valve rod 13 extending centrally through the tube and provided at one end with a tapered closure member 14 which acts as a valve to close the restricted opening 10 in the end of the frusto-conical portion 5. The opposite end of the valve rod is bifurcated so that the two oppositely extending portions form a fork member 15 having their terminal attached to the sliding cap 8 so that when the cap is thrust inwardly as shown in Fig. 1 the valve member 14 will be open permitting a free flow of gas through the valve member whereby it may be taken into the heater through the nipple 1. When the sleeve 3 is removed from the nipple 1, however the spring 12 immediately acts to thrust the cap 8 outwardly whereby the valve rod will be pulled to close the valve member 14 and prevent the passage of gas through the tube 4.

It will be seen from the above that the operation of the device is entirely automatic since it will move to open position when the tube is applied to the gas appliance and will immediately operate to close when the gas pipe is removed from the appliance.

Minor changes may be made in the details of construction without departing from the spirit of the invention or the scope of the claims hereunto appended.

What is claimed is:—

1. In combination with a gas fixture and a supply pipe therefor, and a sleeve connecting the supply pipe with the said fixture, of a valve member including a centrally located tube mounted in the sleeve and provided with a frusto-conical end portion having its restricted end open, a sliding cap mounted on the opposite end of the tube, means to normally urge the sliding cap outwardly from the frusto-conical end, and a valve connected to the said cap and operable in the restricted end of the tube to be opened and closed as the sleeve is attached and detached from the fixture.

2. In combination with a gas fixture, a supply pipe therefor, and a sleeve connecting the supply pipe with the gas fixture, a valve member mounted in the sleeve and including a centrally located tube having a frusto-conical end, the restricted end of the latter being opened, a sliding cap mounted on the end of the said tube, means mounted on the tube to normally thrust the cap away from the frusto-conical end of the valve member, a movable valve mounted to open and close the restricted end of the said frusto-conical portion, and a valve rod connected to the said valve and to the said cap whereby it will be opened and closed when the cap is longitudinally moved on the said tube.

3. A safety valve for gas fixtures comprising a cylindrical tube, a frusto-conical portion formed on one end of the tube and having a restricted open end, the large end forming a shoulder at one end of the tube, a cap slidably mounted on the free end of the tube and provided with an annular flange, a coil spring interposed between the said shoulder and the annular flange, the said cap having an open end, a valve adapted to close the restricted end of the frusto-conical member, a valve rod attached to the cap and to the said valve whereby the valve will be closed when the spring is free to exert a pressure on the said cap.

In testimony whereof, I have affixed my signature in the presence of two witnesses.

FREDRICK G. HENNING.

Witnesses:
  GEORGE HENDERSON,
  DELL KELLEY.